US012640632B2

(12) United States Patent
Masugi et al.

(10) Patent No.: US 12,640,632 B2
(45) Date of Patent: *May 26, 2026

(54) CLAMPING DEVICE

(71) Applicant: TOYOTA JIDOSHA KABUSHIKI
KAISHA, Toyota (JP)

(72) Inventors: Yutaka Masugi, Toyota (JP); Takaaki
Oku, Anjo (JP)

(73) Assignee: TOYOTA JIDOSHA KABUSHIKI
KAISHA, Toyota (JP)

( * ) Notice: Subject to any disclaimer, the term of this
patent is extended or adjusted under 35
U.S.C. 154(b) by 598 days.

This patent is subject to a terminal dis-
claimer.

(21) Appl. No.: 18/176,537

(22) Filed: Mar. 1, 2023

(65) Prior Publication Data

US 2023/0327527 A1 Oct. 12, 2023

(30) Foreign Application Priority Data

Apr. 7, 2022 (JP) ................................. 2022-063901

(51) Int. Cl.
B23P 19/00 (2006.01)
B23K 26/21 (2014.01)
H02K 15/00 (2025.01)
H02K 15/35 (2025.01)

(52) U.S. Cl.
CPC ............. H02K 15/35 (2025.01); B23K 26/21
(2015.10)

(58) Field of Classification Search
CPC ................ B23K 37/0435; B23K 26/21; B23K
2101/36; H02K 15/35
See application file for complete search history.

(56) References Cited

U.S. PATENT DOCUMENTS 10,355,567 B2 * 7/2019 Mizushima .......... H02K 15/085
2023/0268791 A1 * 8/2023 Osugi ...................... H02K 3/50
310/214
2024/0022145 A1 * 1/2024 Suzuki ................... B23K 9/167
2024/0235338 A1 * 7/2024 Furuta ...................... B21F 3/02

FOREIGN PATENT DOCUMENTS

JP 2006-502688 A 1/2006
JP 2007-232023 A 9/2007
JP 2017-98161 A 6/2017
JP 2018-82543 A 5/2018
JP 2020-89108 A 6/2020

* cited by examiner

Primary Examiner — Paul D Kim
(74) Attorney, Agent, or Firm — Oblon, McClelland,
Maier & Neustadt, L.L.P.

(57) ABSTRACT

A clamping device performs a clamping action when per-
forming laser welding to join a first stripped portion, where
a coating is absent from a first end, and a second stripped
portion, where a coating is absent from a second end. A
second claw extends in a radial direction of a second shaft.
In a state in which a first shaft and the second shaft are
moved toward a stator core such that the first end and the
second end are sandwiched between the first shaft and the
second shaft, and the first shaft is pressed against a second
curved portion and the second shaft is pressed against a first
curved portion, the clamping device performs the clamping
action by rotating the second shaft about a center axis of the
second shaft until the second claw comes into contact with
the second end.

7 Claims, 7 Drawing Sheets

CLAMPING DEVICE

BACKGROUND

1. Field

The present disclosure relates to a clamping device and a method for manufacturing a stator.

2. Description of Related Art

Japanese Laid-Open Patent Publication No. 2018-082543 discloses a method for manufacturing a stator of a rotating electric machine. The stator is manufactured by clamping coil segments arranged on a stator core with a clamping device, and welding together the clamped coil segments. The coil segments are coated with an insulative coating. The coating is stripped off from the ends of the coil segments to weld together the ends.

The coil segments include a first coil segment including a first curved portion and a first end. The first curved portion projects out of the stator core and extends clockwise as viewed in an axial direction of the stator core. The first end is continuous with the first curved portion and extends in the axial direction of the stator core. The first end includes a first stripped portion where the coating is stripped off.

Further, the coil segments include a second coil segment including a second curved portion and a second end. The second curved portion projects out of the stator core and extends counterclockwise as viewed in the axial direction of the stator core. The second end is continuous with the second curved portion and extends in the axial direction of the stator core. The second end includes a second stripped portion where the coating is stripped off.

In the method described in the above patent publication, the first stripped portion is clamped with the second stripped portion by electrodes. The clamped first stripped portion and second stripped portion are electrically coupled to each other through tungsten inert gas (TIG) welding.

As described in the above patent publication, TIG welding is performed to electrically couple the first stripped portion and the second stripped portion. To perform TIG welding, the first stripped portion and the second stripped portion need to be long enough to allow for clamping by the electrodes. This may enlarge the stator and is not desirable.

Laser welding may be performed to join the first stripped portion and the second stripped portion. In this case, the electrodes does not have to clamp the first stripped portion and the second stripped portion. This allows the first stripped portion and the second stripped portion to be shorter than when TIG welding is performed.

However, when the stripped portions are relatively short, the heat produced by laser welding will easily be conducted to the coating near the stripped portions. This will raise the temperature of the coating thereby causing damage to the coating.

In the stator manufacturing method described above, the coating of the coil segments may be damaged by the welding heat.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a clamping device is configured to hold a first coil segment and a second coil segment that are arranged on a stator core and coated with an insulative coating. The clamping device is used when performing laser welding to join a first stripped portion, where the coating is absent from a first end of the first coil segment, and a second stripped portion, where the coating is absent from a second end of the second coil segment. The clamping device includes a first shaft arranged to extend in a radial direction of the stator core and a second shaft arranged to extend in the radial direction of the stator core. The first shaft and the second shaft are spaced apart from each other in a circumferential direction of the stator core so that in a state in which the first shaft is pressed against the second coil segment and the second shaft is pressed against the first coil segment, the first shaft and the second shaft sandwich the first end and the second end and hold the first end and the second end in position in the circumferential direction of the stator core. The clamping device is configured to clamp the first end and the second end in a state in which the first end and the second end are held in position in the circumferential direction of the stator core.

In another general aspect, a method for manufacturing a stator is provided. The stator includes a first coil segment and a second coil segment arranged on a stator core and coated with an insulative coating. The method includes positioning the first coil segment and the second coil segment in an axial direction of the stator core by moving a clamping device including a first shaft and a second shaft toward the stator core, and pressing the first shaft against the coating of the second coil segment and the second shaft against the coating of the first coil segment. The method further includes performing laser welding and joining a first stripped portion, where the coating is absent from a first end of the first coil segment, and a second stripped portion, where the coating is absent from a second end of the second coil segment, subsequent to the positioning the first coil segment and the second coil segment.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A clamping device and a method for manufacturing a stator using the clamping device in accordance with an embodiment will be described with reference to the drawings.

Stator 10 Manufactured Using Clamping Device 100

A stator 10 manufactured using a clamping device 100 will now be described with reference to FIGS. 1 to 3. The center axis of a stator core 20 is indicated by the single-dashed line. The description hereafter will use a cylindrical coordinate system of which the center axis of the stator core 20 is the z-axis. The r-radius direction shown in FIG. 1 will be referred to as the radial direction of the stator core 20. The θ-angle direction will be referred to as the circumferential direction of the stator core 20. The z-axis direction will be referred to as the axial direction of the stator core 20. Further, when the stator core 20 is viewed from above in a negative direction of the z-axis, two directions in the circumferential direction will be referred to as a clockwise direction as viewed in the axial direction and a counterclockwise direction as viewed in the axial direction, respectively. In other words, the counterclockwise direction as viewed in the axial direction corresponds to the positive direction of the θ-angle direction, and the clockwise direction as viewed in the axial direction corresponds to the negative direction of the θ-angle direction.

Figure 1:
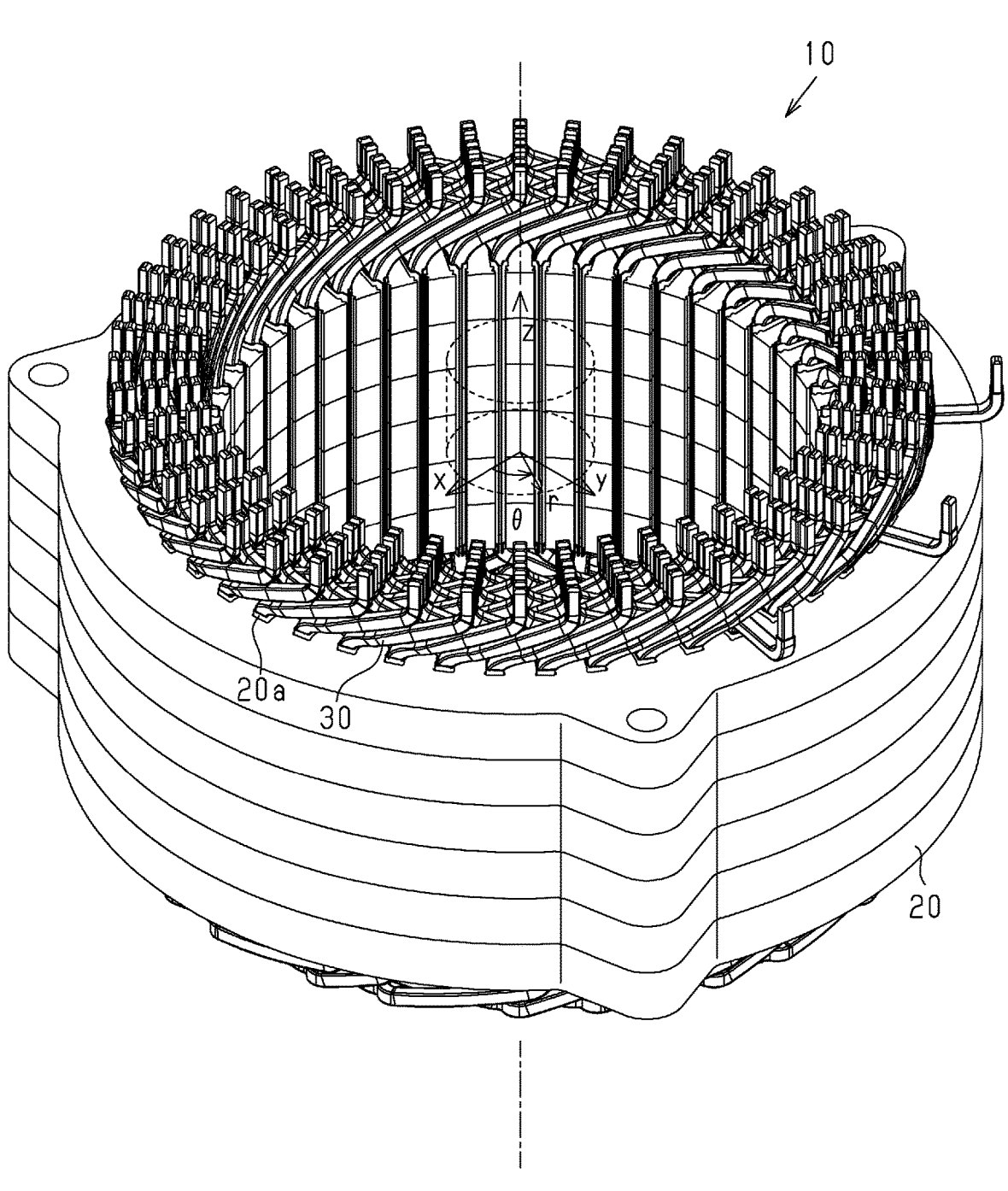
FIG. 1 is a diagram of a stator manufactured with a clamping device in accordance with an embodiment.

As shown in FIG. 1, the stator 10 includes the cylindrical stator core 20 and coil segments 30 accommodated in the stator core 20.

The stator core 20 includes slots 20a arranged at predetermined intervals in the circumferential direction of the stator core 20. Each slot 20a extends in the radial direction of the stator core 20. Each coil segment 30 is arranged in two of the slots 20a.

Figure 2:
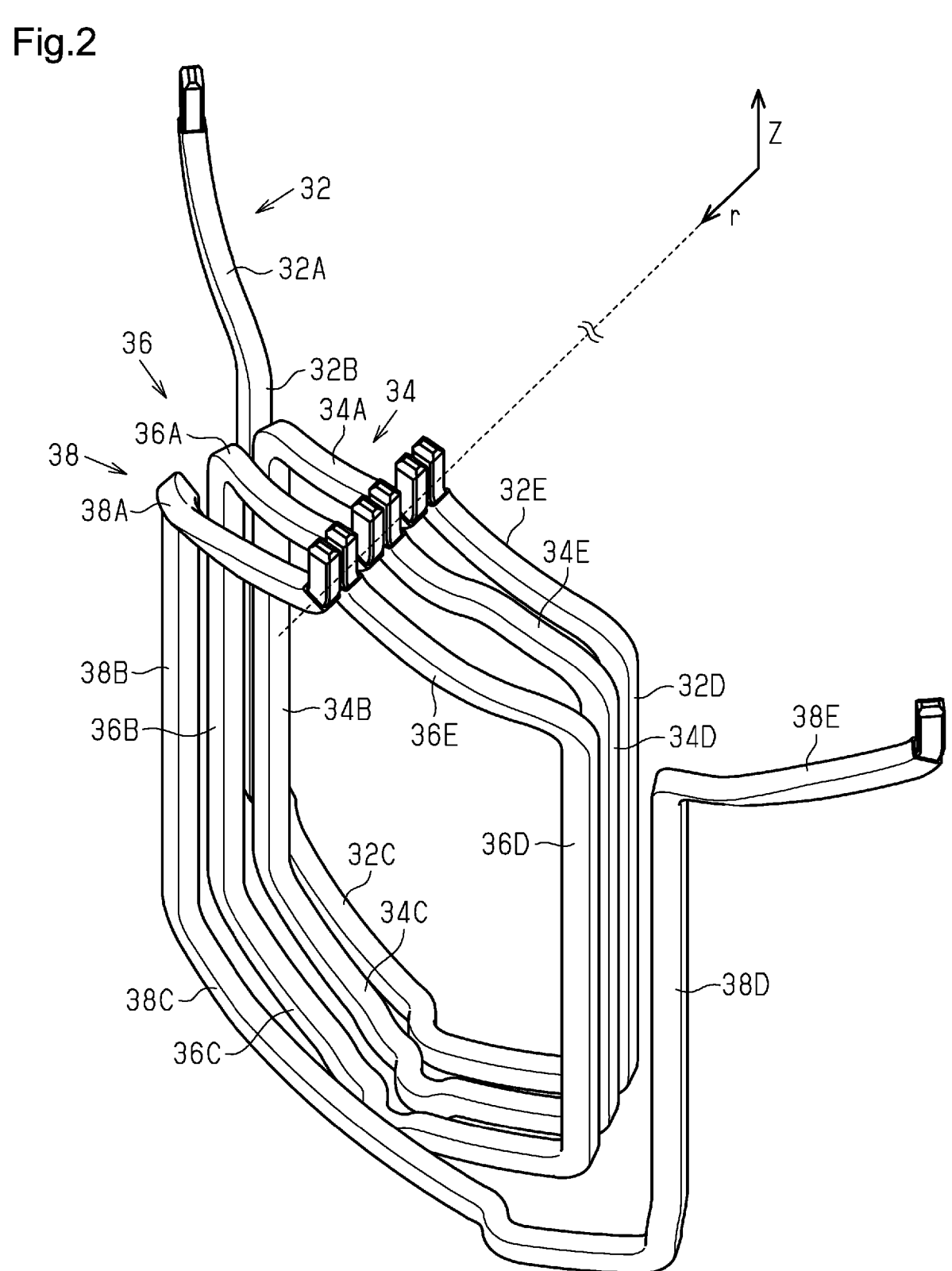
FIG. 2 is a diagram showing part of coil segments included in the stator shown in FIG. 1.

FIG. 2 shows part of the coil segments 30 in the stator 10 shown in FIG. 1. FIG. 2 shows only the coil segments 30 in a state arranged on the stator core 20 and does not show the stator core 20. The coil segments 30 include a first coil segment 32, a second coil segment 34, a third coil segment 36, and a fourth coil segment 38. As shown in FIG. 2, the first coil segment 32, the second coil segment 34, the third coil segment 36, and the fourth coil segment 38 are arranged next to one another in this order in the radial direction of the stator core 20. The first coil segment 32 is located at the radially innermost side, and the fourth coil segment 38 is located at the radially outermost side.

The first coil segment 32 includes a first projecting portion 32A projecting upward from the corresponding slot 20a and extending clockwise as viewed in the axial direction of the stator core 20. The first coil segment 32 includes a first straight portion 32B continuous with the first projecting portion 32A and extending through the slot 20a in the axial direction of the stator core 20. The first coil segment 32 includes a first connecting portion 32C continuous with the first straight portion 32B. The first connecting portion 32C projects downward from the corresponding slot 20a and extends counterclockwise as viewed in the axial direction of the stator core 20. The first coil segment 32 includes a first straight portion 32D continuous with the first connecting portion 32C and extending through the slot 20a in the axial direction of the stator core 20. The first coil segment 32 includes a first projecting portion 32E continuous with the first straight portion 32D. The first projecting portion 32E projects out of the slot 20a and extends clockwise as viewed in the axial direction of the stator core 20.

The second coil segment 34 includes a second projecting portion 34A projecting upward from the corresponding slot 20a and extending counterclockwise as viewed in the axial direction of the stator core 20. The second coil segment 34 includes a second straight portion 34B continuous with the second projecting portion 34A and extending through the slot 20a in the axial direction of the stator core 20. The second coil segment 34 includes a second connecting portion 34C continuous with the second straight portion 34B. The second connecting portion 34C projects downward from the corresponding slot 20a and extends counterclockwise as viewed in the axial direction of the stator core 20. The second coil segment 34 includes a second straight portion 34D continuous with the second connecting portion 34C and extending through the slot 20a in the axial direction of the stator core 20. The second coil segment 34 includes a second projecting portion 34E continuous with the second straight portion 34D. The second projecting portion 34E projects out of the slot 20a and extends clockwise as viewed in the axial direction of the stator core 20.

The third coil segment 36 includes a third projecting portion 36A projecting upward from the corresponding slot 20a and extending counterclockwise as viewed in the axial direction of the stator core 20. The third coil segment 36 includes a third straight portion 36B continuous with the third projecting portion 36A and extending through the slot 20a in the axial direction of the stator core 20. The third coil segment 36 includes a third connecting portion 36C continuous with the third straight portion 36B. The third connecting portion 36C projects downward from the corresponding slot 20a and extends counterclockwise as viewed in the axial direction of the stator core 20. The third coil segment 36 includes a third straight portion 36D continuous with the third connecting portion 36C and extending through the slot 20a in the axial direction of the stator core 20. The third coil segment 36 includes a third projecting portion 36E continuous with the third straight portion 36D. The third projecting portion 36E projects out of the slot 20a and extends clockwise as viewed in the axial direction of the stator core 20.

The fourth coil segment 38 includes a fourth projecting portion 38A projecting upward from the corresponding slot 20a and extending counterclockwise as viewed in the axial direction of the stator core 20. The fourth coil segment 38 includes a fourth straight portion 38B continuous with the fourth projecting portion 38A and extending through the slot 20a in the axial direction of the stator core 20. The fourth coil segment 38 includes a fourth connecting portion 38C continuous with the fourth straight portion 38B. The fourth connecting portion 38C projects downward from the corresponding slot 20a and extends counterclockwise as viewed in the axial direction of the stator core 20. The fourth coil segment 38 includes a fourth straight portion 38D continuous with the fourth connecting portion 38C and extending through the slot 20a in the axial direction of the stator core 20. The fourth coil segment 38 includes a fourth projecting portion 38E continuous with the fourth straight portion 38D. The fourth projecting portion 38E projects out of the slot 20a and extends counterclockwise as viewed in the axial direction of the stator core 20.

Figures 3, 4:
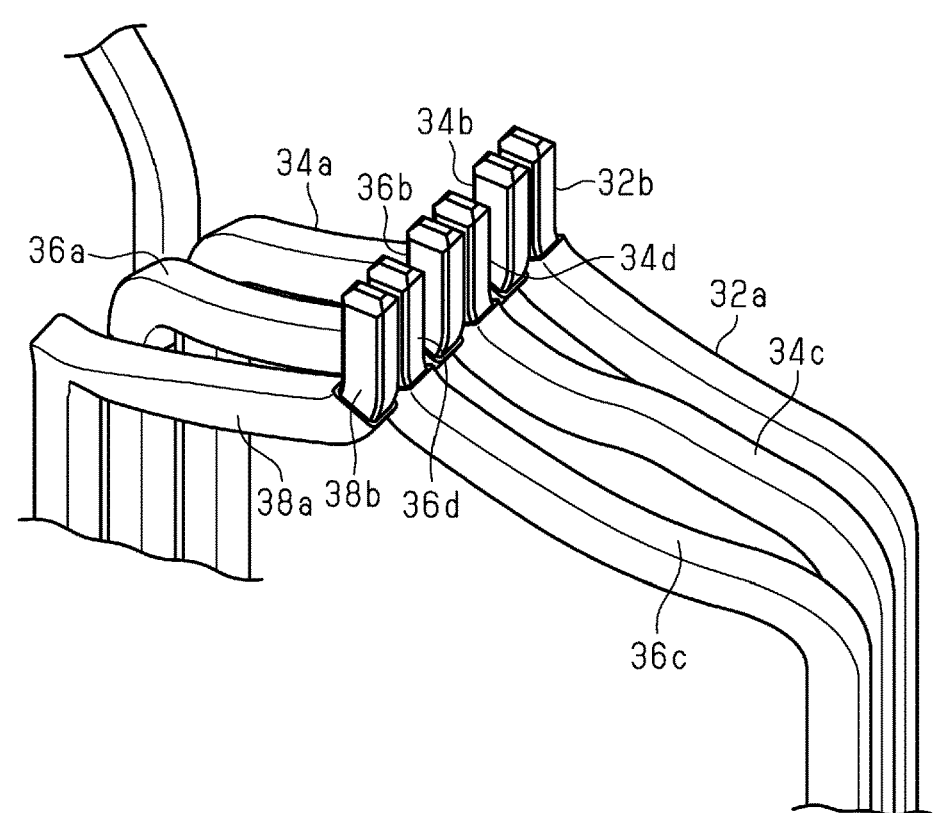
FIG. 3 is an enlarged view of FIG. 2.
FIG. 4 is a perspective view of a clamping device.

As shown in FIGS. 1 to 3, the first coil segment 32 includes a first curved portion 32a and a first end 32b. The first curved portion 32a projects out of the stator core 20 and extends clockwise as viewed in the axial direction of the stator core 20. The first end 32b is continuous with the first curved portion 32a and extends in the axial direction of the stator core 20. The first curved portion 32a and the first end 32b form the first projecting portion 32E. The first coil segment 32 is coated with an insulative coating. The first end 32b includes a first stripped portion where the coating is absent.

The second coil segment 34 includes a second curved portion 34a and a second end 34b. The second curved portion 34a projects out of the stator core 20 and extends counterclockwise as viewed in the axial direction of the stator core 20. The second end 34b is continuous with the second curved portion 34a and extends in the axial direction of the stator core 20. The second curved portion 34a and the second end 34b form the second projecting portion 34A. The second coil segment 34 is coated with an insulative coating. The second end 34b includes a second stripped portion where the coating is absent. The second coil segment 34 includes a second curved portion 34c and a second end 34d. The second curved portion 34c projects out of the stator core 20 and extends clockwise as viewed in the axial direction of the stator core 20. The second end 34d is continuous with the second curved portion 34c and extends in the axial direction of the stator core 20. The second curved portion 34c and the second end 34d form the second projecting portion 34E. The second end 34d includes a second stripped portion where the coating is absent.

The third coil segment 36 includes a third curved portion 36a and a third end 36b. The third curved portion 36a projects out of the stator core 20 and extends counterclockwise as viewed in the axial direction of the stator core 20. The third end 36b is continuous with the third curved portion 36a and extends in the axial direction of the stator core 20. The third curved portion 36a and the third end 36b form the third projecting portion 36A. The third coil segment 36 is coated with an insulative coating. The third end 36b includes a third stripped portion where the coating is absent. The third coil segment 36 includes a third curved portion 36c and a third end 36d. The third curved portion 36c projects out of the stator core 20 and extends clockwise as viewed in the axial direction of the stator core 20. The third end 36d is continuous with the third curved portion 36c and extends in the axial direction of the stator core 20. The third curved portion 36c and the third end 36d form the third projecting portion 36E. The third end 36d includes a third stripped portion where the coating is absent.

The fourth coil segment 38 includes a fourth curved portion 38a and a fourth end 38b. The fourth curved portion 38a projects out of the stator core 20 and extends counterclockwise as viewed in the axial direction of the stator core 20. The fourth end 38b is continuous with the fourth curved portion 38a and extends in the axial direction of the stator core 20. The fourth curved portion 38a and the fourth end 38b form the fourth projecting portion 38A. The fourth coil segment 38 is coated with an insulative coating. The fourth end 38b includes a fourth stripped portion where the coating is absent.

The first curved portion 32a, the second curved portion 34c, and the third curved portion 36c project out of the same slot 20a. The first curved portion 32a, the second curved portion 34c, and the third curved portion 36c are arranged next to one another in this order in the radial direction of the stator core 20.

The second curved portion 34a, the third curved portion 36a, and the fourth curved portion 38a project out of the same slot 20a. The second curved portion 34a, the third curved portion 36a, and the fourth curved portion 38a are arranged next to one another in this order in the radial direction of the stator core 20.

The first end 32b, the second ends 34b and 34d, the third ends 36b and 36d, and the fourth end 38b are arranged next to one another in the radial direction of the stator core 20 and form a group of ends. As shown in FIG. 1, groups of ends are arranged next to one another at equal intervals in the circumferential direction of the stator core 20.

Clamping Device 100

As shown in FIG. 4, the clamping device 100 includes a support plate 50 having an opening 50a. The opening 50a of the support plate 50 is shaped by connecting an inner arc and an outer arc with two lines that are substantially normal to the inner arc. The inner arc and the outer arc are concentric and have the same center angle.

The clamping device 100 includes an arched wall 52 extending from the support plate 50 perpendicularly to the support plate 50. The arched wall 52 extends along the inner arc of the opening 50a. That is, the arched wall 52 is arcuate. The arched wall 52 includes support holes 52a respectively supporting shafts 58, which will be described later. The support holes 52a are arranged in a line.

The clamping device 100 includes posts 54 extending from the support plate 50 perpendicularly to the support plate 50. The arched wall 52 and the posts 54 extend in the same direction. The posts 54 are arranged next to one another along the outer arc of the opening 50a. Each post 54 includes a support pin 56 that supports a shaft 58, which will be described below. When the support plate 50 is level, the support holes 52a will be located at the same height as the support pins 56.

The clamping device 100 includes the shafts 58. Each shaft 58 is supported by the corresponding support hole 52a and the corresponding support pin 56 in a rotatable manner. Specifically, the shaft 58, an arm 62, which will be described later, and the support pin 56 are arranged in this order, and the support pin 56 supports the shaft 58 with the arm 62. Each shaft 58 extends in a radial direction with respect to the center of the circle along which the inner arc of the opening 50a extends. The shafts 58 are arranged next to one another at equal intervals along the inner arc of the opening 50a. Each shaft 58 includes claws 60. The shafts 58 and the claws 60 will be described in detail later.

The clamping device 100 includes the arms 62 respectively fixed to the shafts 58. Each arm 62 extends in a radial direction of the corresponding shaft 58. The arm 62 includes an elongated hole extending in an extension direction of the arm 62. Each arm 62 is coupled to a rod 66 by a coupling pin 64 in a manner allowing for rotation of the rod 66 relative to the arm 62. The coupling pin 64 is slidable in the elongated hole. The rod 66 extends through a hole in the support plate 50. When the support plate 50 is level, the rod 66 extends in the vertical direction. Vertical movement of the rod 66 rotates the shaft 58 about its center axis.
Shafts 58 and Claws 60 of Clamping Device 100

Figure 5:
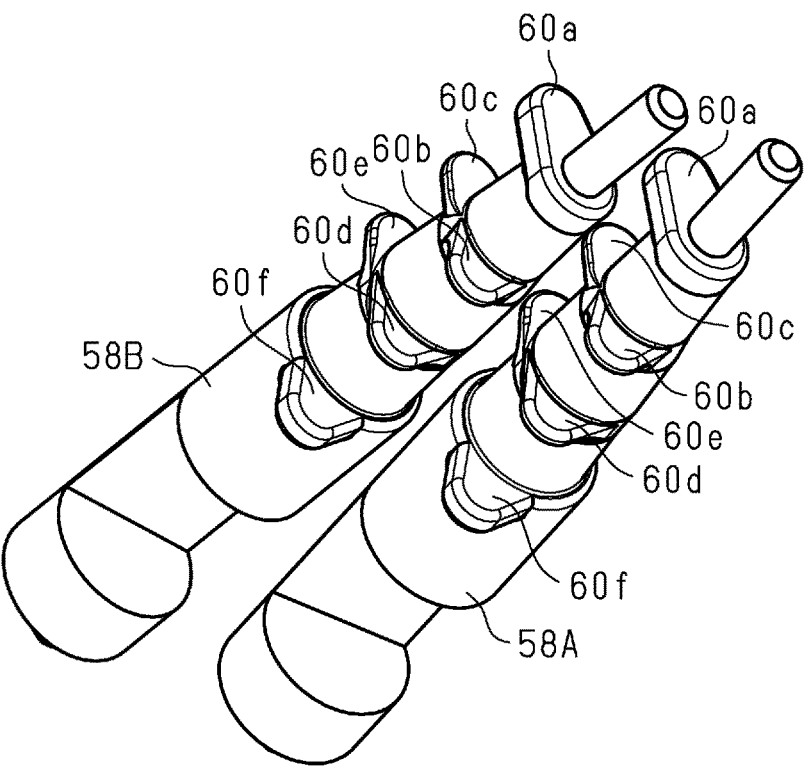
FIG. 5 is a diagram showing part of the clamping device shown in FIG. 4 in a non-clamping state.
Figure 6:
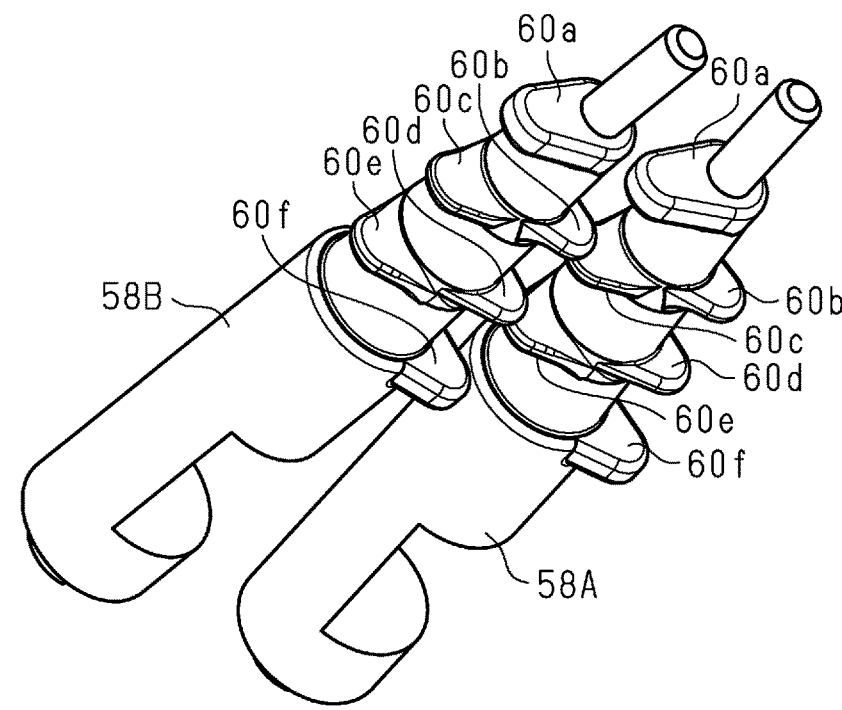
FIG. 6 is a diagram showing part of the clamping device shown in FIG. 4 in a clamping state.

FIG. 5 shows two adjacent ones of the shafts 58 illustrated in FIG. 4. Hereafter, the two shafts 58 will be respectively referred to as the first shaft 58A and the second shaft 58B. FIG. 6 shows the first shaft 58A and the second shaft 58B in a state rotated about their center axes. A state in which the first shaft 58A and the second shaft 58B are rotated to the positions shown in FIG. 6 will be referred to as a clamping state.

Each claw 60 is thinner at a peripheral part than a central part thereof. The claws 60 arranged on the first shaft 58A will be referred to as the first claws 60*a*, 60*b*, 60*c*, 60*d*, 60*e*, and 60*f* (60*a* to 60*f*). The claws 60 arranged on the second shaft 58B will be referred to as the second claws 60*a*, 60*b*, 60*c*, 60*d*, 60*e*, and 60*f* (60*a* to 60*f*).

The first claws 60*a* to 60*f* extend from an intermediate portion of the first shaft 58A in the radial direction of the first shaft 58A. The distal end of the first shaft 58A is supported by the corresponding support hole 52*a*, and the basal end of the first shaft 58A is supported by the corresponding support pin 56. The distal end of the first shaft 58A, the first claws 60*a* to 60*f*, and the basal end of the first shaft 58A are arranged next to one another in this order. The first claws 60*a*, 60*c*, and 60*e* are separated from one another in an axial direction of the first shaft 58A and extend in the same radial direction of the first shaft 58A. The first claws 60*b*, 60*d*, and 60*f* are separated from one another in the axial direction of the first shaft 58A and extend in the same radial direction of the first shaft 58A.

The second claws 60*a* to 60*f* extend from an intermediate portion of the second shaft 58B in the radial direction of the second shaft 58B. The distal end of the second shaft 58B is supported by the corresponding support hole 52*a*, and the basal end of the second shaft 58B is supported by the corresponding support pin 56. The distal end of the second shaft 58B, the second claws 60*a* to 60*f*, and the basal end of the second shaft 58B are arranged next to one another in this order. The second claws 60*a*, 60*c*, and 60*e* are separated from one another in an axial direction of the second shaft 58B and extend in the same radial direction of the second shaft 58B. The second claws 60*b*, 60*d*, and 60*f* are separated from one another in the axial direction of the second shaft 58B and extend in the same radial direction of the second shaft 58B.

As shown in FIG. 6, the first claw 60*a*, the second claw 60*b*, the first claw 60*c*, the second claw 60*d*, the first claw 60*e*, and the second claw 60*f* are arranged next to one another in this order. Also, the second claw 60*b* is in the proximity of the first claw 60*c*, and the second claw 60*d* is in the proximity of the first claw 60*e*.
Operation of Clamping Device 100 and Method for Manufacturing Stator 10

The operation of the clamping device 100 will now be described.

The clamping device 100 is arranged above the stator core 20 shown in FIG. 1. Such a state is schematically shown in FIG. 7.

Figure 7:
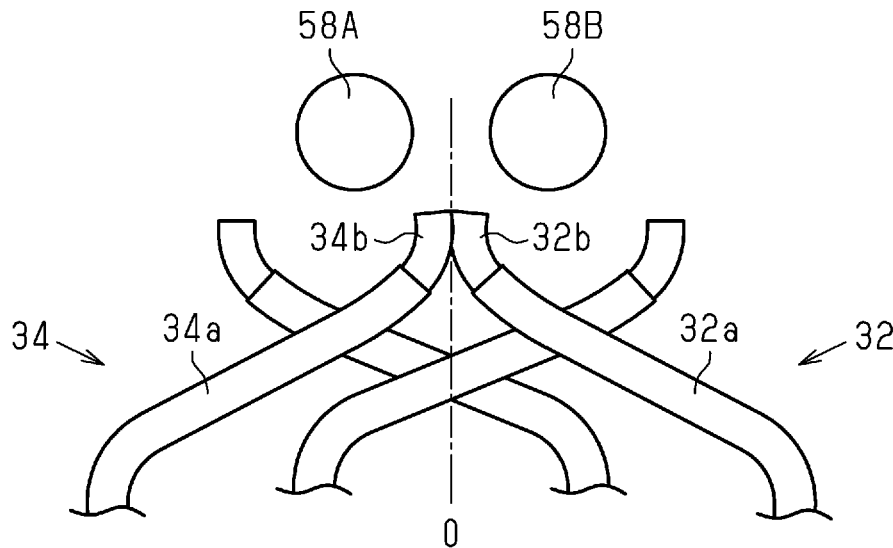
FIG. 7 is a schematic diagram showing the coil segments in a state before being positioned in an axial direction of a stator core.

From the state shown in FIG. 7, the clamping device 100 is brought close to the stator core 20 such that each group of ends is sandwiched between two adjacent shafts 58.

Figure 8:
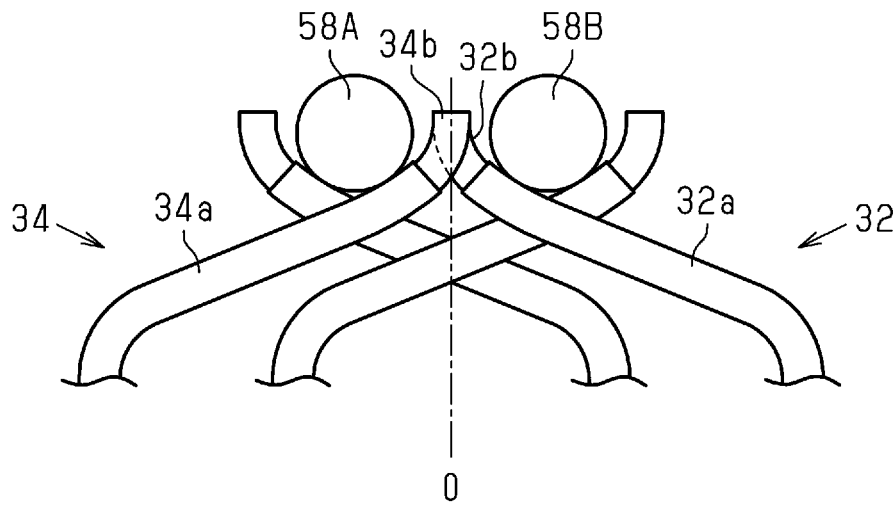
FIG. 8 is a schematic diagram showing the coil segments in a state positioned in the axial direction of the stator core.

As shown in FIG. 8, the shafts 58 are pressed against the coil segments 30. The shafts 58 are pressed against the coil segments 30 to position the coil segments 30 in the axial direction of the stator core 20. When the coil segments 30 are positioned in the axial direction of the stator core 20, the coil segments 30 are simultaneously positioned in the circumferential direction of the stator core 20. Hereafter, the coil segments 30 positioned by the first shaft 58A and the second shaft 58B will be described. The shafts 58 are identical in shape. The shafts 58 are arranged next to one another at equal intervals along the inner arc of the opening 50*a*. In the stator 10 that is being manufactured, the groups of ends are arranged next to one another at equal intervals in the circumferential direction of the stator core 20. Each group of ends belongs to a single coil segment unit, and coil segment units are arranged next to one another in the circumferential direction of the stator core 20. For example, the first coil segment 32, the second coil segment 34, the third coil segment 36, and the fourth coil segment 38 form one coil segment unit. Accordingly, any two adjacent ones of the shafts 58 can perform a clamping action in the same manner as that performed by the first shaft 58A and the second shaft 58B. In a clamping action, the first claw 60*a* and the second claw 60*b* clamp the first end 32*b* and the second end 34*b*. The first claw 60*c* and the second claw 60*d* clamp the second end 34*d* and the third end 36*b*. The first claw 60*e* and the second claw 60*f* clamp the third end 36*d* and the fourth end 38*b*. The clamping action will be described in detail later.

FIG. 7 is a schematic diagram showing the first coil segment 32 and the second coil segment 34 before being positioned in the axial direction of the stator core 20. FIG. 8 is a schematic diagram showing the first coil segment 32 and the second coil segment 34 after being positioned in the axial direction of the stator core 20. The first coil segment 32 before being positioned in the axial direction of the stator core 20 is farther from the stator core 20 than the first coil segment 32 after being positioned in the axial direction of the stator core 20. The second coil segment 34 before being positioned in the axial direction of the stator core 20 is farther from the stator core 20 than the second coil segment 34 after being positioned in the axial direction of the stator core 20. The third coil segment 36 before being positioned in the axial direction of the stator core 20 is farther from the stator core 20 than the third coil segment 36 after being positioned in the axial direction of the stator core 20. The fourth coil segment 38 before being positioned in the axial direction of the stator core 20 is farther from the stator core 20 than the fourth coil segment 38 after being positioned in the axial direction of the stator core 20.

Figure 11:
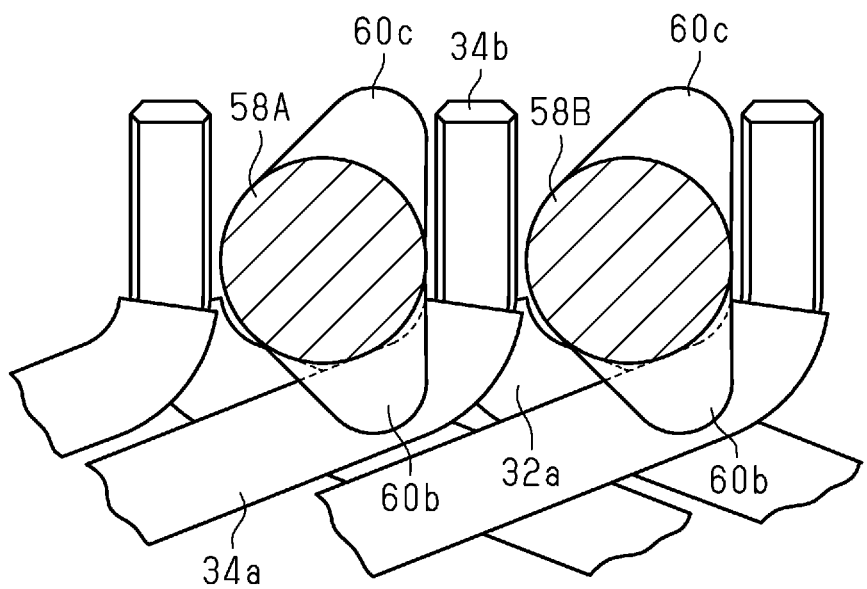
FIG. 11 is a cross-sectional view taken along line 11-11 shown in FIG. 9.

The first shaft 58A and the second shaft 58B are moved toward the stator core 20 so that the first end 32*b*, the second ends 34*b* and 34*d*, the third ends 36*b* and 36*d*, and the fourth end 38*b* are sandwiched between the first shaft 58A and the second shaft 58B. In this manner, the first shaft 58A is pressed against the second curved portion 34*a*, the third curved portion 36*a*, and the fourth curved portion 38*a*, while the second shaft 58B is pressed against the first curved portion 32*a*, the second curved portion 34*c*, the and third curved portion 36*c*. This positions of the first coil segment 32, the second coil segment 34, the third coil segment 36, and the fourth coil segment 38 in the axial direction of the stator core 20. As shown in FIGS. 5 and 11, in the positioning step, the first claws 60*a*, 60*c*, and 60*e* and the second claws 60*a*, 60*c*, and 60*e* are directed away from the stator core 20. Further, the first claws 60*b*, 60*d*, and 60*f* and the second claws 60*b*, 60*d*, and 60*f* are directed toward the stator core 20. In the positioning step, the first shaft 58A and the second shaft 58B are moved toward the stator core 20 with the claws 60 in such an arrangement.

The first shaft 58A and the second shaft 58B are spaced apart from each other in the circumferential direction of the stator core 20 such that the first end 32b, the second ends 34b and 34d, the third ends 36b and 36d, and the fourth end 38b can be sandwiched between the first shaft 58A and the second shaft 58B. This allows the first shaft 58A and the second shaft 58B to hold the first end 32b, the second ends 34b and 34d, the third ends 36b and 36d, and the fourth end 38b in position in the circumferential direction of the stator core 20.

Figures 9, 10:
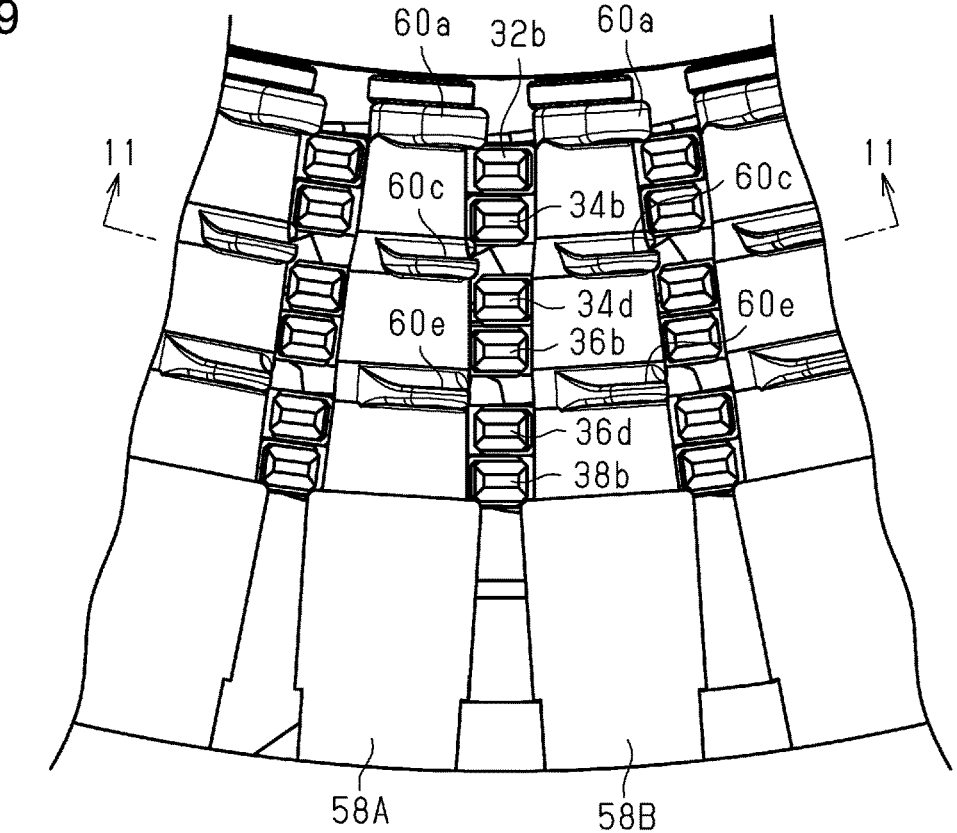
FIG. 9 is a plan view showing part of the clamping device shown in FIG. 4 in a non-clamping state.
FIG. 10 is a plan view showing part of the clamping device shown in FIG. 4 in a clamping state.

FIGS. 8 and 9 show the coil segments 30 in a state positioned in the axial direction of the stator core 20. As shown in FIG. 9, the first shaft 58A and the second shaft 58B are arranged to extend in the radial direction of the stator core 20.

Figure 12:
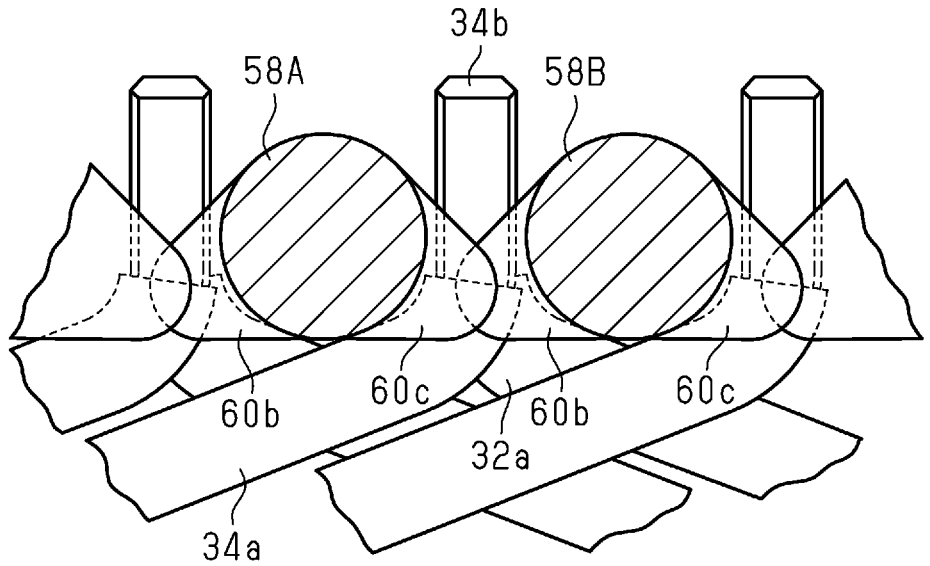
FIG. 12 is a cross-sectional view taken along line 12-12 shown in FIG. 10.

Subsequently, from the state shown in FIGS. 9 and 11, the shafts 58 are rotated to a state shown in FIGS. 10 and 12. As described above, vertical movement of the rods 66 rotates the shafts 58. Specifically, in a state in which the coil segments 30 are positioned in the axial direction of the stator core 20, the first shaft 58A and the second shaft 58B are rotated about their center axes to the state shown in FIGS. 10 and 12. As shown in FIG. 10, the first claw 60a, the first end 32b, the second end 34b, the second claw 60b, the first claw 60c, the second end 34d, the third end 36b, the second claw 60d, the first claw 60e, the third end 36d, the fourth end 38b, and the second claw 60f are arranged next to one another. As shown in FIG. 10, these elements are overlapped with one another in this order in the radial direction of the stator core 20.

Further, the first claw 60a is spaced apart from the second claw 60b by a predetermined distance in the radial direction of the stator core 20. The predetermined distance is set such that the first claw 60a and the second claw 60b clamp the first end 32b and the second end 34b. The first claw 60a contacts the first end 32b, and the second claw 60b contacts the second end 34b.

The first claw 60c is spaced apart from the second claw 60d by a predetermined distance in the radial direction of the stator core 20. The predetermined distance is set such that the first claw 60c and the second claw 60d clamp the second end 34d and the third end 36b. That is, the first claw 60c contacts the second end 34d, and the second claw 60d contacts the third end 36b.

The first claw 60e is spaced apart from the second claw 60f by a predetermined distance in the radial direction of the stator core 20. The predetermined distance is set such the first claw 60e and the second claw 60f clamp that the third end 36d and the fourth end 38b. That is, the first claw 60e contacts the third end 36d, and the second claw 60f contacts the fourth end 38b.

In this manner, the clamping device 100 holds the first coil segment 32 and the second coil segment 34 when performing laser welding to join the first stripped portion, where the coating is absent from the first end 32b, and the second stripped portion, where the coating is absent from the second end 34b. Further, the clamping device 100 holds the second coil segment 34 and the third coil segment 36 when performing laser welding to join the second stripped portion, where the coating is absent from the second end 34d, and the third stripped portion, where the coating is absent from the third end 36b. Furthermore, the clamping device 100 holds the third coil segment 36 and the fourth coil segment 38 when performing laser welding to join the third stripped portion, where the coating is absent from the third end 36d, and the fourth stripped portion, where the coating is absent from the fourth end 38b.

In the method for manufacturing the stator 10, a clamping step is performed on the stator 10 in which the coil segments 30 attached to the stator core 20 have been bent so that the groups of ends are arranged next to one another. Therefore, the clamping device 100 is mounted on and pressed against the stator 10 in a state in which the groups of ends are arranged next to one another. Then, the shafts 58 are rotated to clamp the ends. In the method for manufacturing the stator 10, the clamping device 100 performs the clamping step in this manner.

Subsequently, a welding step is performed while the ends are kept clamped. Specifically, the welding step is performed in a state in which the first shaft 58A is pressed against the second curved portion 34a, the third curved portion 36a, and the fourth curved portion 38a, and the second shaft 58B is pressed against the first curved portion 32a, the second curved portion 34c, and the third curved portion 36c. In the welding step, laser welding is performed to join the first stripped portion, where the coating is absent from the first end 32b, and the second stripped portion, where the coating is absent from the second end 34b, that are clamped by the first claw 60a and the second claw 60b. The first shaft 58A and the second shaft 58B are rotated about their center axes to clamp the first end 32b and the second end 34b. As shown in FIGS. 10 and 12, when the first end 32b and the second end 34b are clamped, the first claw 60a and the second claw 60b are in contact with the coated portions of the first end 32b and the second end 34b. In a state in which the first claw 60a and the second claw 60b are in contact with the coated portions of the first end 32b and the second end 34b, laser welding is performed to join the first stripped portion of the first end 32b and the second stripped portion of the second end 34b.

Further, in the welding step, laser welding is performed to join the second stripped portion, where the coating is absent from the second end 34d, and the third stripped portion, where the coating is absent from the third end 36b, that are clamped by the first claw 60c and the second claw 60d. When the first shaft 58A and the second shaft 58B are rotated about their center axes to clamp the second end 34d and the third end 36b, the first claw 60c and the second claw 60d come into contact with the coated portions of the second end 34d and the third end 36b. In a state in which the first claw 60c and the second claw 60d are in contact with the coated portions of the second end 34d and the third end 36b, laser welding is performed to join the second stripped portion of the second end 34d and the third stripped portion of the third end 36b.

Furthermore, in the welding step, laser welding is performed to join the third stripped portion, where the coating is absent from the third end 36d, and the fourth stripped portion, where the coating is absent from the fourth end 38b, that are clamped by the first claw 60e and the second claw 60f When the first shaft 58A and the second shaft 58B are rotated about their center axes to clamp the third end 36d and the fourth end 38b, the first claw 60e and the second claw 60f come into contact with the coated portions of the third end 36d and the fourth end 38b. In a state in which the first claw 60e and the second claw 60f are in contact with the coated portions of the third end 36d and the fourth end 38b, laser welding is performed to join the third stripped portion of the third end 36d and the fourth stripped portion of the fourth end 38b.

Laser-welding is performed in the same manner on all other portions that are clamped by the clamping device 100.

When every portion clamped by the clamping device 100 has been laser-welded, the clamping device 100 performs an unclamping action. That is, the shafts 58 are rotated from the state shown in FIGS. 10 and 12 to the state shown in FIGS. 9 and 11.

Then, the clamping device 100 is moved to the next location to perform the clamping step and the welding step in the above-described manner. This process will be repeated until welding is completed at every portion where welding is necessary in the stator core 20.

Consequently, the coil segments 30 of the stator core 20 are all electrically connected to one another.

Advantages of Present Embodiment (1) The second shaft 58B contacts the first curved portion 32a, the second curved portion 34c, and the third curved portion 36c. Further, the first shaft 58A contacts the second curved portion 34a, the third curved portion 36a, and the fourth curved portion 38a. In such a state of contact, the first coil segment 32, the second coil segment 34, the third coil segment 36, and the fourth coil segment 38 are clamped.

This allows laser-welding to be performed on the stripped portions in a state in which the first coil segment 32, the second coil segment 34, the third coil segment 36, and the fourth coil segment 38 are clamped.

The second shaft 58B contacts the first curved portion 32a, the second curved portion 34c, and the third curved portion 36c. Further, the first shaft 58A contacts the second curved portion 34a, the third curved portion 36a, and the fourth curved portion 38a. Thus, the heat produced by laser welding will be released to the first shaft 58A and the second shaft 58B from the first curved portion 32a, the second curved portions 34a and 34c, the third curved portions 36a and 36c, and the fourth curved portion 38a. This avoids damage that would be caused by the heat of welding in the coatings of the first coil segment 32, the second coil segment 34, the third coil segment 36, and the fourth coil segment 38.

(2) The first coil segment 32, the second coil segment 34, the third coil segment 36, and the fourth coil segment 38 are positioned in the radial direction of the stator core 20 by the first claws 60a, 60c, and 60e and the second claws 60b, 60d, and 60f.

(3) The first claw 60a and the second claw 60b clamp the coatings of the first end 32b and the second end 34b. The first claw 60c and the second claw 60d clamp the coatings of the second end 34d and the third end 36b. The first claw 60e and the second claw 60f clamp the coatings of the third end 36d and the fourth end 38b. Thus, the heat produced by welding will be released to the first shaft 58A and the second shaft 58B from the first claws 60a, 60c, and 60e and the second claws 60b, 60d, and 60f This further avoids damage that would be caused by welding heat in the coatings of the first coil segment 32, the second coil segment 34, the third coil segment 36, and the fourth coil segment 38.

(4) In the clamping step, the first shaft 58A and the second shaft 58B are rotated about their center axes to positions where the first claw 60a, the first end 32b, the second end 34b, and the second claw 60b overlap one another in the radial direction of the stator core 20. Accordingly, the first end 32b comes into contact with the peripheral part of the first claw 60a, and then the central part of the first claw 60a. Also, the second end

34b comes into contact with the peripheral part of the second claw 60b, and then the central part of the second claw 60b. This allows the first end 32b and the second end 34b to be gradually moved and positioned in the radial direction of the stator core 20. This configuration is particularly effective when ends are simultaneously clamped at a number of locations as described in the above embodiment. Thus, a large number of coil segments 30 are gradually moved together for positioning, and the coil segments 30 will be moved in a uniform and well-balanced manner.

(5) A number of portions arranged in the radial direction of the stator core 20 can be clamped simultaneously.

(6) A number of portions arranged in the circumferential direction of the stator core 20 can be clamped simultaneously.

(7) When the rods 66 are moved in the axial direction of the rods 66, the shafts 58 are rotated about their center axes. In other words, a clamping action occurs when moving the rods 66 in the axial direction.

(8) In the positioning step, the clamping device 100 is brought close to the stator core 20 such that the ends are sandwiched between the shafts 58. In the positioning step, as shown in FIGS. 5 and 11, the first claws 60b, 60d, and 60f and the second claws 60b, 60d, and 60f are directed downward, and the first claws 60a, 60c, and 60e and the second claws 60a, 60c, and 60e are directed upward. FIG. 12 shows a state in which the first claws 60a to 60f and the second claws 60a to 60f are directed in a direction orthogonal to the axial direction of the stator core 20. As compared to when the clamping device 100 is brought close to the stator core 20 in the state shown in FIG. 12, the first claws 60a to 60f and the second claws 60a to 60f are less likely to interfere with the coil segments 30 in the positioning step. This avoids damage to the stripped portions that would be caused by the first claws 60a to 60f and the second claws 60a to 60f.

The present embodiment may be modified as follows. The present embodiment and the following modifications can be combined as long as the combined modifications remain technically consistent with each other.

In the above embodiment, the clamping device 100 includes the shafts 58. The number of shafts 58 may be changed. The number of shafts 58 only needs to be two or greater.

The shafts 58 may be arranged next to one another along the entire circumference of the stator core 20 to simultaneously clamp all ends of the coil segments in the clamping step.

In the above embodiment, the first end 32b, the second ends 34b and 34d, the third ends 36b and 36d, and the fourth end 38b are arranged next to one another in the radial direction of the stator core 20 to form a group of six ends. This is merely an example, and a single group may be formed by any number of the ends.

In the above embodiment, each shaft 58 includes the claws 60. The number of claws 60 may be changed. For example, the first shaft 58A may include only the first claw 60a, and the second shaft 58B may include only the second claw 60b.

In the above embodiment, the first shaft 58A and the second shaft 58B are rotated about their center axes to clamp the first end 32b and the second end 34b. When the first end 32b and the second end 34b are clamped, the first claw 60a and the second claw 60b are in contact with the coated portions of the first end 32b and the second end 34b. For example, the first claw 60*a* and the second claw 60*b* may be in contact with only non-coated portions of the first end 32*b* and the second end 34*b*. Further, the first claw 60*c* and the second claw 60*d* may be in contact with only non-coated portions of the second end 34*d* and the third end 36*b*. The first claw 60*e* and the second claw 60*f* may be in contact with only non-coated portions of the third end 36*d* and the fourth end 38*b*.

In the above embodiment, each claw 60 is thinner at the peripheral part than the central part thereof. Alternatively, the claw 60 may have the same thickness in the peripheral part and the central part. The claw 60 may be partially thinner at the peripheral part than the central part. The claw 60 may have a thickness that varies in a continuous manner or in a stepped manner.

In the above embodiment, the second end 34*b* comes into contact with left side of the second claw 60*b* before coming into contact with the right side as viewed in FIG. 11. In the above embodiment, the second claw 60*b* is thinner at the peripheral part than the central part thereof. Alternatively, the second claw 60*b* may be thinner at the left side than the right side as viewed in FIG. 11. In other words, the claw 60 may be thinner at the leading-end than the trailing-end. The leading end of the claw 60 refers to a part of the claw 60 that approaches an end of a coil segment before the trailing end, and the trailing end of the claw 60 refers to a part of the claw 60 that approaches the end of the coil segment after the leading end.

When the stator core 20 is viewed from above in the above embodiment as shown in FIGS. 1 to 3, the first coil segment 32 includes the first curved portion 32*a* projecting from the stator core 20 and extending clockwise as viewed in the axial direction of the stator core 20. Alternatively, when the stator core 20 is viewed from above, the first coil segment 32 may include the first curved portion 32*a* projecting from the stator core 20 and extending counterclockwise as viewed in the axial direction of the stator core 20. In this case, the second curved portion 34*c* and the third curved portion 36*c* project from the stator core 20 and extend counterclockwise as viewed in the axial direction of the stator core 20. Further, the second curved portion 34*a*, the third curved portion 36*a*, and the fourth curved portion 38*a* project from the stator core 20 and extend clockwise as viewed in the axial direction of the stator core 20.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A clamping device configured to hold a first coil segment and a second coil segment that are arranged on a stator core and coated with an insulative coating, wherein the clamping device is used when performing laser welding to join a first stripped portion, where the coating is absent from a first end of the first coil segment, and a second stripped portion, where the coating is absent from a second end of the second coil segment, the clamping device comprising:

a first shaft arranged to extend in a radial direction of the stator core; and a second shaft arranged to extend in the radial direction of the stator core, wherein:

the first shaft and the second shaft are spaced apart from each other in a circumferential direction of the stator core so that in a state in which the first shaft is pressed against the second coil segment and the second shaft is pressed against the first coil segment, the first shaft and the second shaft sandwich the first end and the second end and hold the first end and the second end in position in the circumferential direction of the stator core; and the clamping device is configured to clamp the first end and the second end in a state in which the first end and the second end are held in position in the circumferential direction of the stator core.

2. The clamping device according to claim 1, further comprising:

a first claw extending from an intermediate portion of the first shaft in a radial direction of the first shaft; and a second claw extending from an intermediate portion of the second shaft in a radial direction of the second shaft, wherein:

the first claw is spaced apart from the second claw by a predetermined distance in the radial direction of the stator core; and the predetermined distance is set such that, as viewed in an axial direction of the stator core, the first claw and the second claw clamp the first end and the second end in a state in which the first claw overlaps the second claw in the radial direction of the stator core.

3. The clamping device according to claim 2, wherein the clamping device is configured to hold the first coil segment and the second coil segment by contacting coated portions of the first end and the second end with the first claw and the second claw.

4. The clamping device according to claim 2, wherein:

the clamping device is configured to hold the first coil segment and the second coil segment by contacting the first end with the first claw and contacting the second end with the second claw;

the first claw is thinner at a peripheral part than a central part thereof; and the second claw is thinner at a peripheral part than a central part thereof.

5. The clamping device according to claim 2, wherein:

the first coil segment includes a first curved portion projecting out of the stator core and extending clockwise as viewed in the axial direction of the stator core, the first end being continuous with the first curved portion and extending in the axial direction of the stator core;

the second coil segment includes a second curved portion projecting out of the stator core and extending counterclockwise as viewed in the axial direction of the stator core, the second end being continuous with the second curved portion and extending in the axial direction of the stator core, another second curved portion projecting out of the stator core and extending clockwise as viewed in the axial direction of the stator core, and another second end continuous with the other second curved portion and extending in the axial direction of the stator core;

a third coil segment coated with an insulative coating includes a third curved portion projecting out of the stator core and extending counterclockwise as viewed in the axial direction of the stator core, and a third end continuous with the third curved portion and extending in the axial direction of the stator core;

the clamping device is configured to hold the second coil segment and the third coil segment when performing laser welding to join another second stripped portion, where the coating is absent from the other second end, and a third stripped portion, where the coating is absent from the third end;

the first claw is one of two first claws extending in the same radial direction of the first shaft and spaced apart from each other in an axial direction of the first shaft;

the second claw is one of two second claws extending in the same radial direction of the second shaft and spaced apart from each other in an axial direction of the second shaft; and the two first claws and the two second claws clamp the first end, the second end, the other second end, and the third end in a state in which the two first claws, the two second claws, the first end, the second end, the other second end, and the third end overlap one another in the radial direction of the stator core.

6. The clamping device according to claim 2, further comprising:

a third shaft arranged to extend in the radial direction of the stator core; and a third claw extending from an intermediate portion of the third shaft in a radial direction of the third shaft, wherein:

the first coil segment and the second coil segment form a coil segment unit, the coil segment unit is one of two coil segment units arranged next to each other in the circumferential direction of the stator core;

in each of the two coil segment units, the first stripped portion overlaps the second stripped portion in the radial direction of the stator core;

the first shaft, the second shaft, and the third shaft are arranged counterclockwise in this order as viewed in the axial direction of the stator core;

the second shaft includes another second claw; and when the first claw and the second claw clamp the first end and the second end in one of the two coil segment units, the other second claw and the third claw clamp the first end and the second end in the other one of the two coil segment units.

7. The clamping device according to claim 1, further comprising:

a first arm fixed to the first shaft and extending in a radial direction of the first shaft, the first arm including a first elongated hole extending in an extension direction of the first arm;

a first rod coupled to the first arm by a first coupling pin, slidable in the first elongated hole, in a manner allowing for rotation relative to the first arm;

a second arm fixed to the second shaft and extending in a radial direction of the second shaft, the second arm including a second elongated hole extending in an extension direction of the second arm; and a second rod coupled to the second arm by a second coupling pin, slidable in the second elongated hole, in a manner allowing for rotation relative to the second arm.

* * * * *